United States Patent [19]
Wicklund

[11] Patent Number: 5,251,395
[45] Date of Patent: Oct. 12, 1993

[54] PRINTED ELASTOMER FISHING LURE DRESSING

[76] Inventor: Craig Wicklund, 3030 Westwood Rd., Minnetonka Beach, Minn. 55361

[21] Appl. No.: 914,426

[22] Filed: Jul. 15, 1992

[51] Int. Cl.⁵ .............................................. A01K 85/00
[52] U.S. Cl. .................................... 43/42.25; 43/42.53
[58] Field of Search ............... 43/42.53, 42.24, 42.26, 43/42.25; 156/233; 427/587

[56] References Cited

U.S. PATENT DOCUMENTS

| | | | |
|---|---|---|---|
| 2,563,825 | 8/1951 | Ebert | 43/42.53 |
| 2,718,033 | 9/1955 | Burke | 43/42.53 |
| 2,718,668 | 9/1955 | Burke | 43/42.53 |
| 3,021,632 | 2/1962 | Gombar | 43/42.28 |
| 3,122,853 | 3/1964 | Koonz et al. | 43/42.24 |
| 3,245,171 | 4/1966 | Henry | 43/42.24 |
| 3,685,197 | 8/1972 | McClellan | 43/42.24 |
| 4,215,506 | 8/1980 | LeBoeuf | 43/42.53 |
| 4,335,495 | 6/1982 | Buchanan | 43/42.53 |
| 4,429,482 | 2/1984 | Honse | 43/42.24 |
| 5,039,745 | 8/1991 | Riddle | 427/387 |
| 5,045,360 | 9/1991 | Kosal et al. | 427/387 |
| 5,085,894 | 2/1992 | Pascucci et al. | 427/387 |

FOREIGN PATENT DOCUMENTS

2587648  3/1987  France ................. 43/42.53

OTHER PUBLICATIONS

Bass Pro Shops Catalog 1990, "Northland Gypsi Jig", p. 150.

Primary Examiner—Kurt C. Rowan
Assistant Examiner—Jeanne M. Elpel
Attorney, Agent, or Firm—Douglas L. Tschida

[57] ABSTRACT

Durable, colorfast elastomer fishing lure dressings and lures including same wherein silicone based colorants are printed onto the dressing material. In a preferred construction, a planar, elastomer substrate is printed on desired upper and lower surfaces with a silicone based colorant in desired patterns. The colorant is permanently fixed in a subsequent thermal curing step. Metalized, accent foils may be bonded to the colorant before curing. The colorant comprises a liquid vinyl silicone carrier which may include varieties of colored pigments, scents, glitters and chromatic particulates.

14 Claims, 5 Drawing Sheets

PRINTED ELASTOMER FISHING LURE DRESSING

BACKGROUND OF THE INVENTION

The present invention relates to fishing lures and components for use therewith and, in particular, to a colorfast, silicone based skirt dressing.

Tentacled or filamentary dressings have long been used as dressings for a variety of fishing lures. Such dressings have been formed from a variety of natural hairs (i.e. deer hair, squirrel tail, deer tail etc.), feathers, yarn, clumps of stranded polymers or metalized films, and slit elastomers, among other materials. Elastomer dressings have particularly become a dressing of choice for freshwater and saltwater lure manufacturers.

U.S. Pat. No. 5,007,193 discloses a lure commonly referred to as a "spinner" or "buzz" bait which includes an elastomer skirt that is tied or fastened to a prepared lure body. The skirt is formed from a bulk dye colored elastomer sheet stock (i.e. having the same color or overlapping bands of color). The colored material is mechanically slit or diced into a plurality of filaments which are bound together at bordering trim pieces. A shortcoming of such a skirt is that many times it is preferable that a skirt having a patterned or spot type color treatment be available.

Another problem inherent to state of the art dyed skirts is that over time (i.e. within months) the dyes bleed or migrate through the substrate material with a corresponding loss of color definition. Due also to the adhesion resistant properties of silicone based elastomers, attempts to surface bond conventional colorants to the elastomer substrate have proven ineffective. Thus, lure designers have not been able to design long lived, colorfast skirted lures which mimic naturally occurring color schemes or patterns of bait or prey species or color schemes designed to appeal to the consumer. Lure coloration has thus predominantly been relegated to painted metal form or plastic form bodies and to which bulk dyed, solid color skirts are attached.

In addition to colorants, filamentary metalized accents have been combined with such skirts or alternatively other types of metalizable materials have been used in substitution of elastomer skirts. Such dressings typically comprise strands of a metalized foil alone or strands of a foil which is plated or bonded onto a suitable carrier substrate. The foils, however, do not readily bond to silicone based elastomer substrates, due to the adhesion resistance of the substrate material. Conventional polymer and gel elastomers substrates otherwise have not proven particularly durable with prolonged use in water and exposure to sun and heat.

SUMMARY OF THE INVENTION

It is accordingly a primary object of the invention to provide a colorfast coloration process for elastomers.

It is a further object of the invention to provide silicone based lure dressings treated with durable, colorfast colorants.

It is a further object of the invention to provide a printable colorant including a silicone based carrier and preferred dry mix pigments and/or chromatic additives, which colorant thermally bonds to a silicone substrate.

It is a further object of the invention to provide a printable, thermally cured silicone based carrier for bonding metalized foils to a silicone based substrate.

Various of the foregoing objects, advantages and distinctions of the invention are particularly obtained in a silicone based elastomer substrate which is formed into lure dressings that include a plurality of slit, filamentary strips or tentacles. The substrate is pattern printed with one or more clear or pigmented silicone based colorants, which are thermally bonded to place. Scents and chromatic particulates may be added to the carrier. A metalized foil may be bonded to the colorant before curing. Conventional coating and printing techniques are employed to obtain any conceivable coloration pattern. Wide varieties of chromatically pleasing lure dressing are thereby achievable.

Once colored, the substrate is die cut into a number of dressings. Each dressing includes numerous filaments which are bound together via a strap fastener to form a skirt. The skirts are separately attachable to a lure of choice.

Still other objects, advantages and distinctions of the invention will become more apparent from the following detailed description with respect to the appended drawings. Various considered modifications, enhancements and improvements are described as appropriate. While illustrative of a presently preferred construction, the description should not be literally construed nor interpreted in limitation to the spirit and scope of the invention as claimed within the appended claims.

DESCRIPTION OF THE PREFERRED EMBODIMENT

Figure 1:
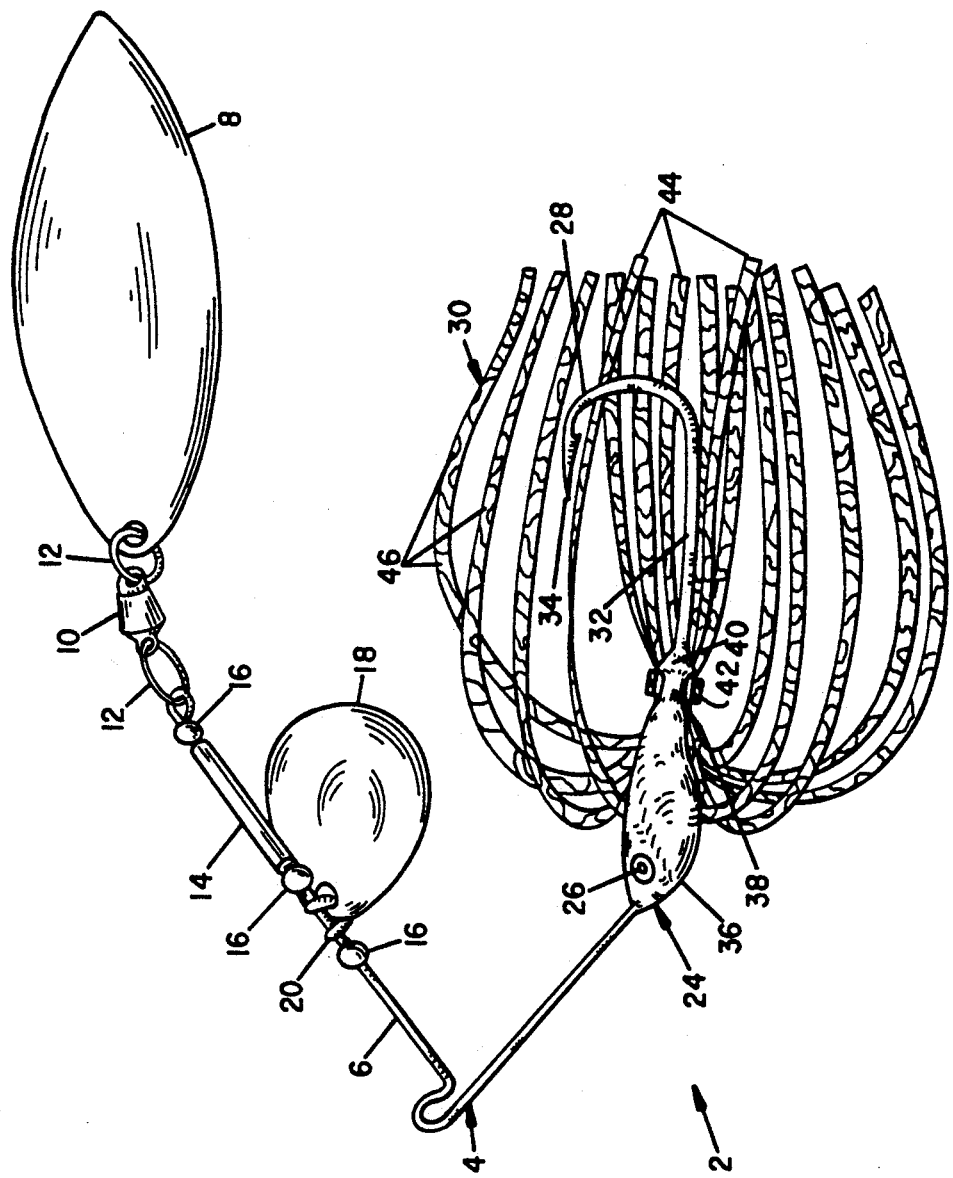
FIG. 1 is an elevation drawing, shown in partial cutaway, of a skirt containing spinner bait which includes the invention.

Referring to FIG. 1, a drawing is shown of a typical fishing lure 2 which is commonly referred to as a "spinner" or "buzz" bait. Such lures 2 are frequently used when fishing for large and small mouth bass, northern pike and muskey in North America. Depending upon conditions and geographic locale, obviously, other fresh or saltwater species may also be fished with the lure 2.

The lure 2 is generally configured about a wire form member 4 that is pre-bent to a defined shape. Secured to the wire form 4 along an upper shank portion 6 is a "willow leaf" spinner blade 8, which is attached via a swivel 10 and a pair of split rings 12. Also provided along the shank 6 are a tubular spacer 14, a plurality of colored beads 16 and a "Colorado" spinner blade 18, which is secured at a "stirrup" clevis 20. The configuration depicted is sometimes referred to as a "tandem" rig. It is to be appreciated, however, that numerous varieties or other configurations containing one or more spinner blades and various other colored attractants and lure dressings can be added. Dressings may be included to accentuate a vibratory action at the lure. Varieties of sound inducing lure components may also be added to obtain auditory characteristics.

Secured to a lower shank portion 22 of the wire form 4 is a molded body 24. The body can be cast from lead or a variety of other materials. Typically the body 24 and/or spinner blades 8 and 18 are painted to desired color schemes. Other features, such as the depicted eye 26, can be added as desired.

Projecting from the body 24 and molded in place with the body 24 and wire-form 4 is a fish hook 28. A filamentary skirt 30 is secured to the body 24 to obscure or camouflage the hook 28. The hook 28 is molded into the body 24 such that the shank 32 extends posteriorly and curves to a barbed point 34. Depending upon the lure size, the size of the hook 28 can be varied. Similarly, additional hooks may be added to either the body 24 or as attachments or so called "trailer" hooks at the primary hook 28.

Figure 2:
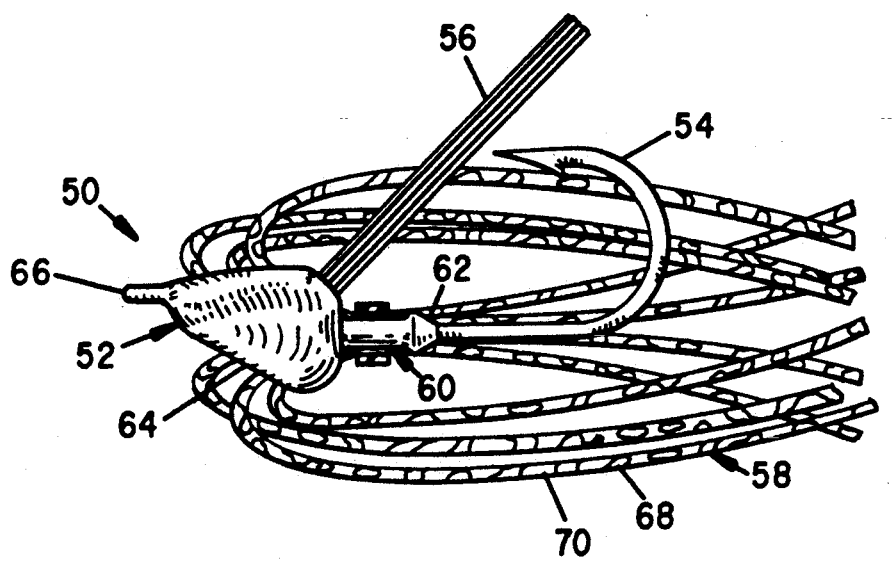
FIG. 2 is an elevation drawing in partial cutaway of a molded body lure including an improved skirt dressing.

The body 24 is configured to provide a bulbous forward portion 36 and rearwardly of which extends an elongated projection 38 (see also FIG. 2). A tapered flange 40 radially extends from the projection 38, although additional flanges 40 or protuberances can be provided. The skirt 30 is secured and supported to the projection 38 via a suitable wrap fastener 42. The fastener 42 may comprise a rubber band or wire wrap member. The skirt 30 is mounted such that the tentacles or filamentary pieces 44 of the skirt 30 hide the hook 28. Although the skirt 30 can be constructed from a variety of materials, a preferred material is a silicone based elastomer. Such materials are durable and accommodate use in either fresh or salt water. Typically the skirt 30 is fabricated from a solid color elastomer. The elastomer may however be treated with various dyes to obtain additional coloration.

Figure 3:
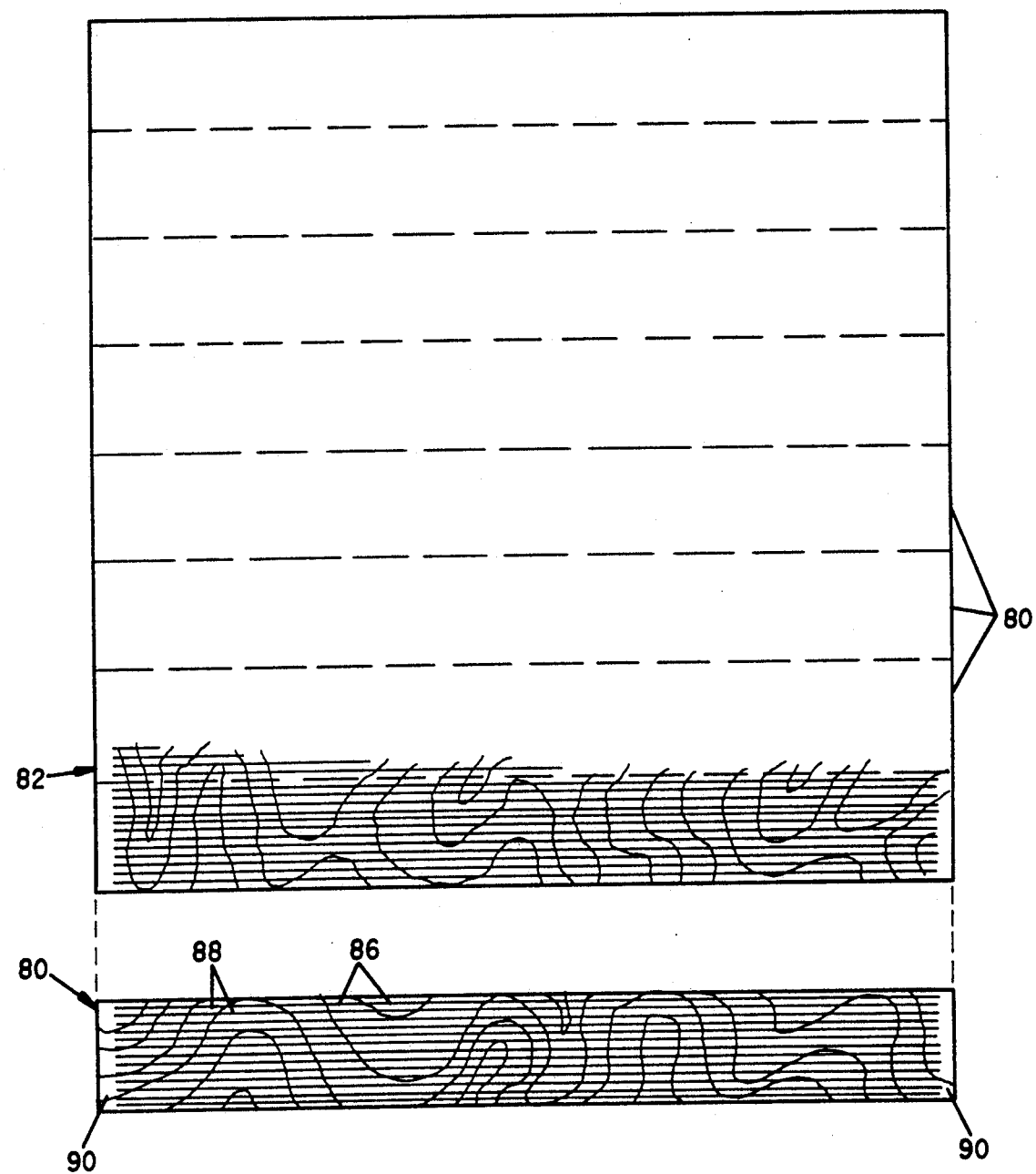
FIG. 3 is a plan view of a typical skirt dressing several as from a larger piece of adjacent sheetgoods.
Figure 4:
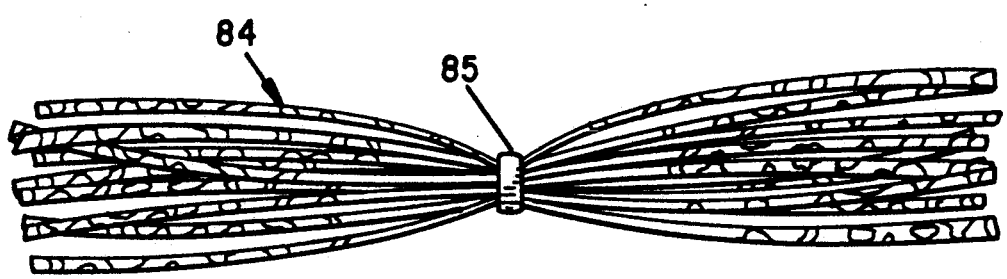
FIG. 4 is a view of a metalized skirt dressing.

An advantage of the lure 2 is that the base colored skirt 30 is printed over with a patterned, colorfast colorant 46 and which may also serve as an adhesive for a laminated foil (reference FIGS. 2 and 4). The details of the process for fabricating the improved skirt 30 will be discussed with respect to FIGS. 3 through 5.

FIG. 2, otherwise, depicts a jig type lure 50. The lure 50 comprises a body 52, which may be molded from lead or zinc and which is cast over a desired barbed hook 54. Projecting from the body 52 at a desired angular orientation are a plurality of bristles or fibers 56 which particularly project to protect the point of the hook 54. The bristles 56 are relatively stiff and ward away undesired debris, weeds or the like, yet flex with a fish strike to obtain proper hook set.

Apparent from the cutaway portion of an attached skirt 58 is an elongated body projection 60 which has an end flange 62. A lower, forward surface 64 of the body 52 adjacent a hook eye 66, provides a flat surface which permits the lure 50 to stand partially upright, upon allowing the lure 50 to rest on a lake or ocean bottom.

The skirt 58 is substantially similar to the skirt 30 of FIG. 1. However, in addition to a patterned areas of variegated colorant 68, areas of a patterned metal foil 70 are also laminated to the skirt 58. In combination, the patterned areas of colorant and foil 68 and 70 provide a preferred color scheme. The scheme may replicate the coloration of a preferred prey or bait species or an angler preferred color scheme.

Figure 5:
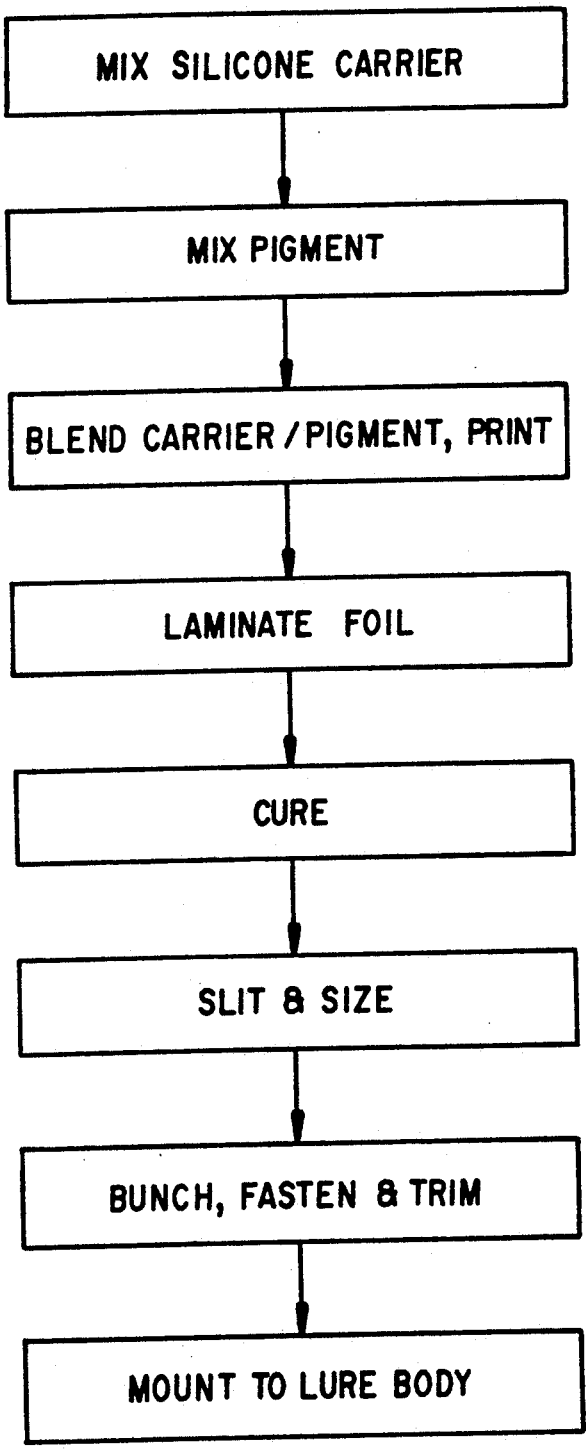
FIG. 5 is a flow diagram of the process used to fabricate the improved skirt dressing and lures using same.

With attention next to FIGS. 3 through 5, the details of the construction of the presently improved skirt dressings 30 and 58 are provided. FIG. 3 depicts a printed section 80, which has been segmented from a larger sheet stock substrate 82 that has been printed and slit to general size. That is, each skirt dressing 30 and 58 is typically formed from a piece 80 of larger sheet goods 82 which has been diced into a number of smaller pieces 80, which pieces 80 have been coated with a colorant and other chromatic elements and which are eventually reduced to a prepared skirt or lure dressing 84 as shown at FIG. 4. With the slitting of the sheet stock 82, a plurality of lateral slits 86 are formed through the central region of each piece 80 to define a number of filaments or tentacles 88. The filaments 88 are bound to one another at edge borders 90.

With the preparation of the individual skirt pieces 80, each piece 80 is separately handled and pinched at a center region and whereat a fastener 85, such as a rubber band, is secured. The end borders 90 are then or just prior, trimmed away. The skirt 84 is then ready to be mounted over a hook and onto the elongated surface projections 38 or 60. The tentacles 88 are then arranged to project rearward from the lure body 24, 52 to provide an enticing action with lure movement.

With further attention to the flow chart of FIG. 5, it is to be appreciated that the improved skirts of the present invention are colorized in a screen printing process which uses thermal setting, colorants. The colorants particularly comprise a liquid silicone based carrier. The carrier is specially prepared to be compatible with the elastomer substrate 82 and to which various pigments and additives are appropriately mixed. The prepared colorant is printed in a preferred pattern onto exposed surfaces of the substrate 82. The coating or printing process can be performed using a variety of conventional printing techniques, although a presently preferred technique comprises a vacuum type screen printing. Either a single or multiple coatings having the same or different patterns can be applied. The same technique may also be used to not only colorize the skirts, but also to laminate foils to the substrate material.

With reference also to Table 1 below, the process begins with the preparation of the silicone carrier. The liquid carrier is particularly obtained upon preparing a mixture of silicone based conformal coatings such as are used to encapsulate electrical circuit assemblies. The coatings normally provide a passivation layer to protect the assemblies from environmental exposure. The coatings are not normally used as an adhesive or pigment carrier.

While many of such coatings exist, it has determined that a particular mixture of one part of a Dow Corning conformed coating material part no. Q1-4010 mixed with three parts of a General Electric conformal coating material, part no. ECC-450 produces a desirable carrier. The former material comprises a dimethyl vinylated and trimethylated silica composition, whereas the latter comprises a vinyl polydimethyl siloxane. The specific ingredients of each coating material can be obtained from corresponding specification sheets available from the suppliers. Upon mixing the materials, however, a solventless silicone mixture is obtained which adhesively bonds to the silicone based elastomer sheet goods substrate 82. Another coating material which can be used without mixing is GE part no. Ge-440.

TABLE I

| SILICONE CARRIER MIXTURES | | | | |
|---|---|---|---|---|
| DOW Q1-4010 (parts) | GE ECC-450 (parts) | GE440 (parts) | CURE (°F.) | TIME (min) |
| 1 | 3 | — | 360 | 3 |
| 1 | 3 | — | 230 | 30 |

TABLE I-continued

| SILICONE CARRIER MIXTURES | | | | |
|---|---|---|---|---|
| DOW Q1-4010 (parts) | GE ECC-450 (parts) | GE440 (parts) | CURE (°F.) | TIME (min) |
| 1 | 3 | — | 266 | 15 |
| — | — | 1 | 360 | 3 |
| — | — | 1 | 230 | 30 |
| — | — | 1 | 266 | 15 |

The pigment portion of the colorant is obtained upon mixing a separate silicone based liquid with appropriate dry pigment materials, which are compatible with the silicone liquid silicone carrier and which are not susceptible to migration upon subsequent curing of the colorant. A preferred material for dissolving the pigment is a silicone oil sold by Wacker Corporation as part no. SW-101. Otherwise, the dry mix pigments are obtained from Acrachem Corporation.

The pigments are of a dry mix type and are mixed with the silicone oil at a nominal mixer speed of approximately 3500 to 5000 rpm with a shear blade. In contrast to using conventional propeller or auger mixing blades, a shear type blade mechanically reduces the pigment and more uniformly disperses the pigment into the silicone oil. Upon completion of mixing, a paste-like mixture is obtained. Depending upon the color desired, suitable quantities and colors of pigment are added in conventional fashion.

The prepared pigment is next blended with the separately prepared liquid silicone carrier to obtain the presently preferred colorant. The carrier and pigments are normally hand or machine blended at a relatively low speed to avoid aeration and the creation of bubbles within the colorant. Table II demonstrates various colorant mixtures which have been developed. It has also been determined that various scents and glitters can be added to the colorant. Pearl and phosophorescent colorants may also be mixed with appropriate pigments.

TABLE II

| COLORANT MIXTURES | | | | |
|---|---|---|---|---|
| CARRIER (parts) | COLOR* (parts) | CURE (°F.) | TIME (min) | PRESS (lb) |
| 100 | 20-black | 365 | 3 | — |
| 100 | 18-chartreuse | 350 | 4 | — |
| 100 | 25-white | 365 | 4 | — |
| 100 | 20-scent | 325 | 7 | — |
| 100 | (transparent) | 365 | 3 | — |
| 100 | FOIL | 350 | 350 | 75 |

*Various pigments, colored particulates, glitters and scents can be added as desired.

As mentioned, the skirts are preferably printed in a screen printing process. The presently preferred process utilizes a screen mesh selected in the range of 160 to 300 mesh, which has been covered over with a conventional light sensitive emulsion, and which is exposed through a positive patterned film. The prepared screen is then used in conventional screen printing fashion. Depending upon the pattern being printed, one or more prepared meshes may be used in multiple coating steps.

Once the colorant is printed onto the substrate 80, the substrate 80 is advanced to a curing step. During this step, the substrate 80 is positioned on a conveyor which passes through an air curing tunnel that develops an appropriate temperature to thermally set the colorant. Presently, a temperature in the range of 350 to 400 degrees Fahrenheit and a cure time of two to three minutes is preferred. The conformal coating materials, otherwise, are normally cured at lower temperatures in the range of 200 degrees and over longer durations. The present, accelerated cure cycle has however been found sufficient to obtain colorfast skirts. When multiple coatings are applied, the substrate is typically cured between each coating.

For those occasions where metalized skirts are desired, intermediate the printing and curing step, a desired metalized foil material is laminated over selected portions 70 of the colorant. A preferred foil comprises a metalized material which is formed onto a MYLAR carrier or transfer sheet (not shown). Such sheets can be cut to preferred size and shape prior to mounting over the printed substrate 82. An appropriate roller is used to mechanically transfer the foil from the transfer sheet onto the printed colorant which acts as an adhesive and presents a sufficient tackiness to retain the foil, yet permit removal of the foil from the transfer sheet. The laminated skirt is then cured as described above. Depending again upon the type of skirt dressing 84 desired, the silicone carrier can be used alone as an adhesive and without pigmentation, since the material is essentially colorless prior to the addition of pigments thereto.

With the printing and curing of the sheet stock 82, preparation of the dressings 30 and 58 and lure assemblies 2 and 50 proceeds in the fashion previously described.

While the invention has been described with respect to its presently preferred construction, method of manufacture and compositions, still other compositions and constructions may suggest themselves to those skilled in the art. Accordingly, the following claims should be interpreted to include all those equivalent embodiments within the spirit and scope thereof.

What is claimed is:

1. An elastomer fishing lure dressing comprising:
   a) a silicone based elastomer substrate having a colorant containing a liquid silicone carrier coated onto an exposed surface of the substrate and thermally cured to said surface and wherein said substrate is separated into a plurality of filaments; and
   b) means for semi-permanently binding said filaments to one another.

2. An article as set forth in claim 1 including a metalized foil and wherein regions of the cured colorant adhesively bond said foil to said exposed surface.

3. An article as set forth in claim 1 including a plurality of coatings of a plurality of colorants, wherein each of said plurality of colorants contains a liquid silicone carrier and a suspended pigment, wherein each of said coatings is applied in a pattern having a predetermined orientation to each other.

4. An article as set forth in claim 1 wherein the cured colorant comprises a liquid silicone carrier containing a dispersed dry pigment which colorant is thermally cured to the substrate at a temperature in the range of 300 to 400 degrees Fahrenheit.

5. An article as set forth in claim 1 wherein said binding means comprises portions of said substrate.

6. A method for constructing a fishing lure dressing comprising:
   a) mixing a liquid silicone carrier with a pigmented colorant to evenly distribute said colorant through said carrier and obtain a prepared colorant;
   b) applying said prepared colorant to a surface of a silicone based elastomer substrate;

c) thermally curing said prepared colorant to said substrate at a temperature in the range of 300 to 400 degrees Fahrenheit; and d) dicing said substrate into a plurality of filaments.

7. A method as set forth in claim 6 including the step of applying a metalized foil to a surface of said substrate containing the prepared colorant prior to curing said prepared colorant, whereby said metalized foil is bonded to said substrate upon thermally curing said prepared colorant.

8. A method as set forth in claim 6 wherein said step of applying said prepared colorant further comprises screen printing said prepared colorant onto said substrate.

9. A method as set forth in claim 6 including the further steps of mixing a second prepared colorant containing said liquid silicone carrier and a second pigmented colorant, applying said second prepared colorant to a surface of said substrate and thermally curing said second colorant to said substrate.

10. A method as set forth in claim 6 wherein said liquid silicone carrier comprises a conformal silicone coating material.

11. A method as set forth in claim 10 wherein said pigmented colorant, comprises a dry pigment mixed with a silicone oil carrier.

12. A method as set forth in claim 6 including the step of separating ones of said filaments from said substrate into a grouping and securing the filaments of the grouping to one another.

13. A method as set forth in claim 6 wherein dicing said substrate includes splitting said substrate into a plurality of regions, wherein each region contains ones of said plurality of filaments and wherein portions of said substrate at each region retain the ones of said filament to one another.

14. A method for constructing a fishing lure dressing comprising:

a) mixing a liquid silicone carrier with a pigmented colorant to evenly distribute said colorant through said carrier and obtain a prepared colorant;

b) applying said prepared colorant to a surface of a silicone based elastomer substrate;

c) thermally curing said prepared colorant to said substrate at a temperature in the range of 300 to 400 degrees Fahrenheit; and d) preparing said fishing lure dressing from said silicone based elastomer substrate.

* * * * *